Dec. 26, 1922.
F. J. LAIRD.
DRILL BIT DIE.
FILED OCT. 23, 1920.
1,440,019.
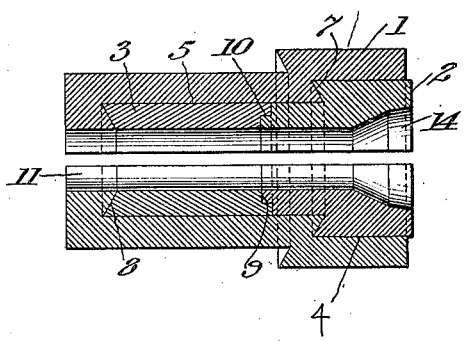
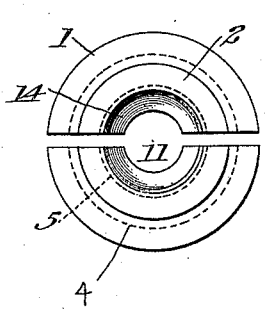
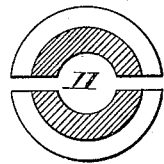
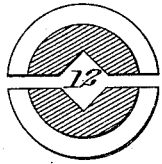
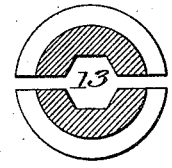
Inventor
Frank J. Laird
By Byrnes Townsend & Brickenstein
Attorneys Patented Dec. 26, 1922.

1,440,019

UNITED STATES PATENT OFFICE.

FRANK J. LAIRD, OF BUTTE, MONTANA.

DRILL-BIT DIE.

Application filed October 23, 1920. Serial No. 419,062.

*To all whom it may concern:*

Be it known that I, FRANK J. LAIRD, a citizen of the United States, residing at Butte, in the county of Silverbow and State of Montana, have invented certain new and useful Improvements in Drill-Bit Dies, of which the following is a specification.

The present invention relates to drill bit sharpeners and more particularly to a new and useful improvement in drill bit dies of the character described in my application No. 397,036 filed July 17, 1920.

The general object of the present invention is a construction which allows one master die to be used for all shapes and sizes of drill bits and drill steel.

Another object is to reduce to a minimum the amount of tool steel necessary to form and sharpen drill bits and still another object is to make each wearing surface separate and removable and independent from the other.

For a full understanding of the invention reference is had to the accompanying drawings in which—

Fig. 1 is a sectional view of a die embodying the invention;

Fig. 2 is an end view thereof;

Fig. 3 is a transverse section through the inner bushing;

Fig. 4 is a similar section through a modified form of bushing; and

Fig. 5 is a similar section through another modified form of bushing.

In the drawings 1 represents a split clamping die or master die which is preferably made of any suitable low priced material and 2 and 3 are bushing elements forming the component parts of what may mechanically be considered as a single split bushing.

The first or outer bushing 2 forms or moulds the drill steel and determines its size and shape, whereas the second or back bushing 3 holds or clamps the drill steel. The former is made of high grade material, preferably high carbon tool steel while the latter may be of different and lower grade material.

The clamping die 1 is formed to define in its outer portion a recess 4 and intermediate this recess and the inner end a second recess 5 of smaller diameter than recess 4. The shoulder resulting from the formation of the two recesses is preferably beveled. Similarly the shoulder at the inner end of the recess 5 is beveled.

The outer bushing 2 has an undercut beveled shoulder 7 accurately fitting the shoulder at the end of the recess 4 and the bushing 3 has a beveled edge 8 accurately fitting the shoulder at the inner end of the recess 5. The inner end of bushing 2 and the outer end of bushing 3 are preferably provided with interengaging faces. In the particular form illustrated, the end of one bushing is reduced to form a tenon 9 and the end of the other bushing is inwardly recessed at 10 to receive the tenon 9. The just described arrangement has the purpose to hold the bushings in place in the die when the bottom and top parts are separated to insert the steel to be sharpened or remove the sharpened steel from it.

The opening 11 at the inner end of the die 1 is large enough to accommodate the drill steel of whatever shape it may be. In the form shown in Figs. 1 and 2 the inner surface of the bushings 2 and 3 is cylindrical to clamp a round drill shank. The surface of the opening 11 in this instance is or may be flush with the inner surface of the bushings.

In Fig. 4 the inner surface 12 is formed to receive a square shank, while in Fig. 5 the inner surface 13 is formed to receive a hexagonal shank. In either case the opening 11 is of such diameter that the corners of the cross-sectional area of the shank fall within the surface of the opening 11.

The forming surface 14 of the die has a double taper similar to the device described in my said application.

By the arrangement described one die 1 which may be termed a "master die," may be used for all shapes and sizes of drill bits and drill steel. Either of the two bushings may be replaced when it has become useless without affecting the other bushing or the master die. This is of particular importance inasmuch as the quantity of high-carbon steel necessary for drill sharpening is reduced to a minimum.

I claim:—

1. For use in drill bit sharpening machines, a master die and a removable bushing consisting of two parts in end to end relation, a forming part and a holding part.

2. For use in drill bit sharpening machines, a master die and a removable bushing consisting of two parts in end to end relation, a forming part of high grade material and a holding part of lower grade material.

3. For use in drill sharpening machines, a split master die and a removable split bushing consisting of two separate parts, a forming part and a holding part, and means on the adjoining ends of said parts for holding them in alignment.

4. For use in drill sharpening machines, a split master die and a removable split bushing consisting of two separate parts, a forming part and a holding part, means on the adjoining ends of said parts for holding them in alignment and means on the opposite ends of said parts and on the master die for holding the bushing to the die.

5. The combination of a split master die for sharpening drill steel, a removable split bushing consisting of separate parts, a forming part and a holding part, the adjoining ends of said parts being formed to have interlocking engagement adapted to hold the parts in alignment and the opposite ends of the said parts having beveled shoulders co-operating with corresponding recesses in the die to hold the bushing to the die.

6. For use in a master die for sharpening drill steel, a bushing consisting of two parts in end to end relation, one of the parts of high grade material serving as a forming part and the other of said parts of lower grade material serving as a holding part.

7. For use in a master die for sharpening drill steel, a bushing consisting of a high grade steel part and a part of lower grade material, the adjoining ends having interlocking engagement adapted to hold the parts in alignment.

In testimony whereof, I affix my signature.

FRANK J. LAIRD.